United States Patent [19]

Garlock

[11] Patent Number: 4,732,072

[45] Date of Patent: Mar. 22, 1988

[54] AUDIO TEACHING SYSTEM FOR USE IN CHORAL INSTRUCTION

[76] Inventor: Frank W. Garlock, P.O. Box 6524, Greenville, S.C. 29606

[21] Appl. No.: 34,739

[22] Filed: Apr. 6, 1987

Related U.S. Application Data

[63] Continuation-in-part of Ser. No. 695,435, Jan. 28, 1985.

[51] Int. Cl.⁴ .............................................. G09B 15/00
[52] U.S. Cl. ..................................... 84/470 R; 369/92
[58] Field of Search ............. 84/470 P, 470 R; 369/4, 369/5, 92

[56] References Cited

U.S. PATENT DOCUMENTS

| | | | |
|---|---|---|---|
| 2,123,258 | 7/1938 | Ranger | 84/470 |
| 2,844,663 | 7/1958 | Friess | 396/4 |
| 3,217,428 | 11/1965 | Spaulding | 84/470 |
| 3,774,494 | 11/1973 | Reid, Sr. et al. | 84/470 |

Primary Examiner—L. T. Hix
Assistant Examiner—David M. Gray
Attorney, Agent, or Firm—Bailey & Hardaway

[57] ABSTRACT

An audio teaching system for use in choral instruction is illustrated having a four-track cassette recorder/player interconnected with a four-channel amplifier leading to a set of earphone amplifier control boxes, each having a single earphone attached thereto.

The system provides for said cassette player to be used in conjunction with specially prepared tapes having the four harmonic parts of the music selection recorded on separate channels.

Each of said control boxes has its own volume control, amplifier, single earphone, and also contains a selector switch which allows the choir member to choose to monitor one or all of the harmonic parts.

3 Claims, 4 Drawing Figures

AUDIO TEACHING SYSTEM FOR USE IN CHORAL INSTRUCTION

This is a Continuation-in-Part of my copending application Ser. No. 06/695,435, filed Jan. 28, 1985 entitled AN AUDIO TEACHING SYSTEM FOR USE IN CHORAL INSTRUCTION.

BACKGROUND OF THE INVENTION

A choral instructional system is illustrated in U.S. Pat. No. 2,123,258 wherein it is provided for two interconnected turntables to play specially produced records, each containing two parts of a four-part harmony. Each of said records is used to feed audio to two sections of a choir with low pass and high pass filters employed to increase the loudness of the appropriate harmonic part, with such filtered outputs feeding the entire pertaining section of the choir.

The aforementioned system did not allow the repetition of a particular portion of the music selection without listening to the entire selection from the beginning, nor did it allow the listener individual control of the volume or select the individual part he desires to hear. Furthermore, a monitoring of all harmonic parts together required the playing of another record separately.

U.S. Pat. No. 2,844,663 discloses the use of a number of loud speakers positionable at selected locations to simulate the arrangement of a group of musical instruments for performance before an audience. Only the main operator selects the tracks to be played and the volume at which each speaker operates.

Accordingly, it is an important object of the present invention to provide an audio teaching system for use in choral instruction wherein a four-channel cassette recorder/player is utilized in conjunction with specially prepared tapes having the four harmonic parts, soprano, alto, tenor and bass, recorded on separate channels, whereby the choir practices the music selection with each member monitoring the appropriate harmonic part via an earphone.

Another important object of the invention is to provide full syncronization of the four harmonic parts so that any portion of the music selection may be repeated at random.

Another important object of the invention is to provide individual control boxes whereby each listener selects a volume level and one or all of the harmonic parts.

Still another important object of the invention is to provide components with compact dimensions so as to make the system fully portable.

Another important object of the invention is the provision of a choral instructional system wherein a plurality of controlled boxes are connected in series, each box being for a participant and including an amplifier having volume control wherein each participant may control the volume at which that participant desires to hear a selected part. A single earphone is provided at each station or control box so that a participant may hear a selected part at a selected level of sound while leaving one ear free to hear the sounds around them in a closed system without interference with a neighbor.

This system is designed to accommodate any number of individual control boxes from one to one hundred twenty without loss of signal level or degradation of audio signal quality to any individual control box.

Another important object of the invention is the provision of means for connecting and disconnecting and positioning the control boxes at each station whereby a control box may be connected or disconnected and replaced when a given control box is out of operation and wherein a cord is provided of selectable length coming from the control box. Means are also provided for positioning the respective control boxes for convenient use by each participant. This interconnecting system allows for efficient change in choir formation and position to accommodate varying needs of choral groups.

SUMMARY OF THE INVENTION

It has been found that an audio teaching system may be provided, for use in choral instruction, having a four-track cassette recorder/player interconnected with a low power four-channel amplifier leading to a set of earphone amplifier control boxes, each having a high-impedance single earphone attached thereto. Preferably, the cassette player is used in conjunction with specially prepared tapes having the four harmonic parts of the music selection recorded on separate channels. The choir then practices the selection with each member using an earphone to monitor the appropriate harmonic part. Each of the control boxes has its own volume control and also contains a selector switch which allows the choir member to choose to monitor one or all of the harmonic parts.

Thus a closed circuit system has been provided wherein each participant in a choral presentation or practice can hear what he desires to hear at a selected sound level and can hear those around him without adversely affecting the sounds heard by a neighbor.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
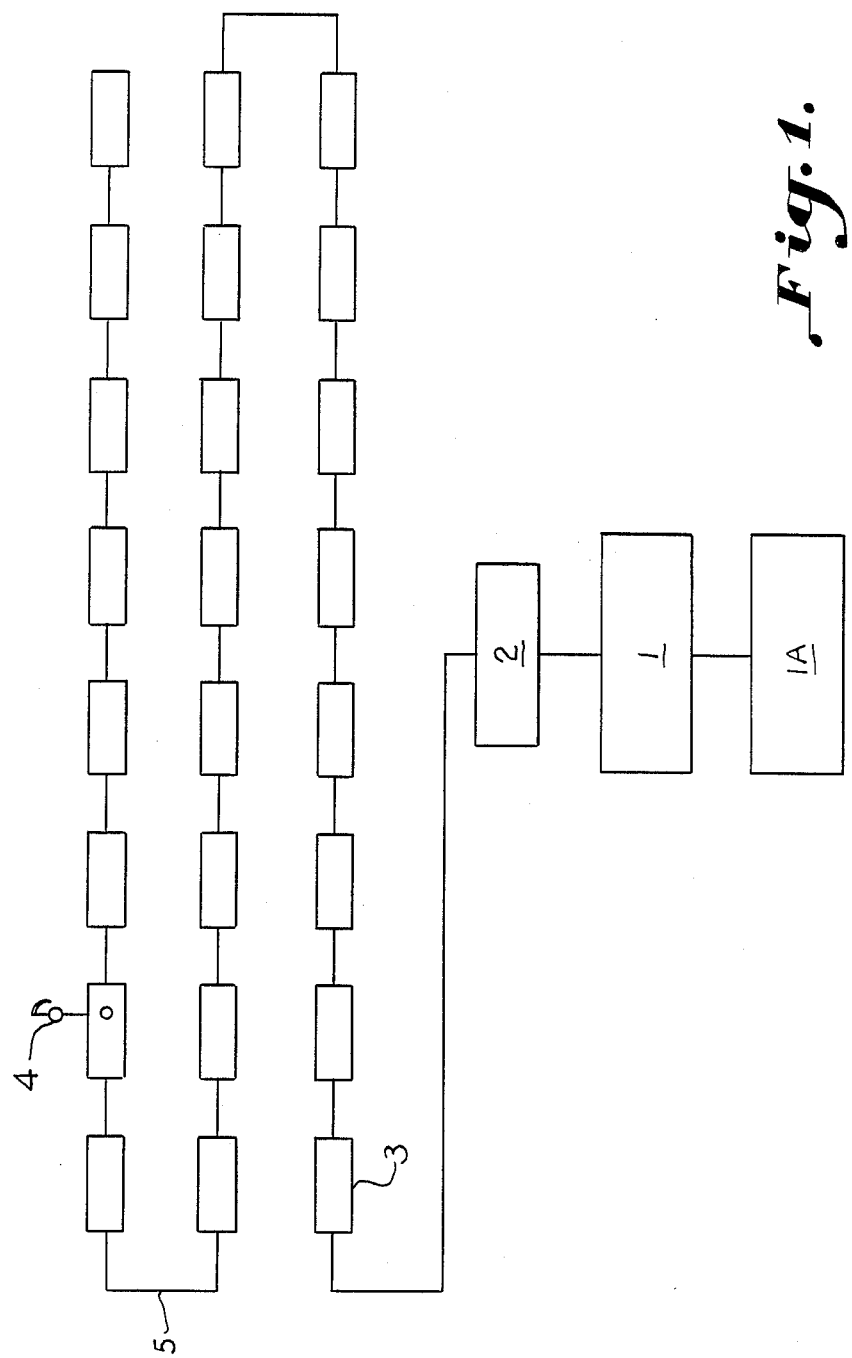
FIG. 1 is a schematic plan view illustrating an audio teaching system for use in choral instruction.

FIG. 1 illustrates an audio teaching system, for use in choral instruction, comprising a four-track cassette recorder/player 1; a low noise, low power four-channel amplifier 2; a set of earphone amplifier control boxes 3; and a set of high impedance single earphones 4. The aforementioned components of said system are connected by means of cable 5 with the amplifier control boxes serially connected. Said cassette player is used in conjunction with specially prepared tapes having the four harmonic parts of the music selection recorded on separate channels. Furthermore, said cassette player contains a four-channel mixer and equalizer 1a and has the capability to record or play four tracks simultaneously with said tracks being in the same direction and fully syncronized.

Figure 2:
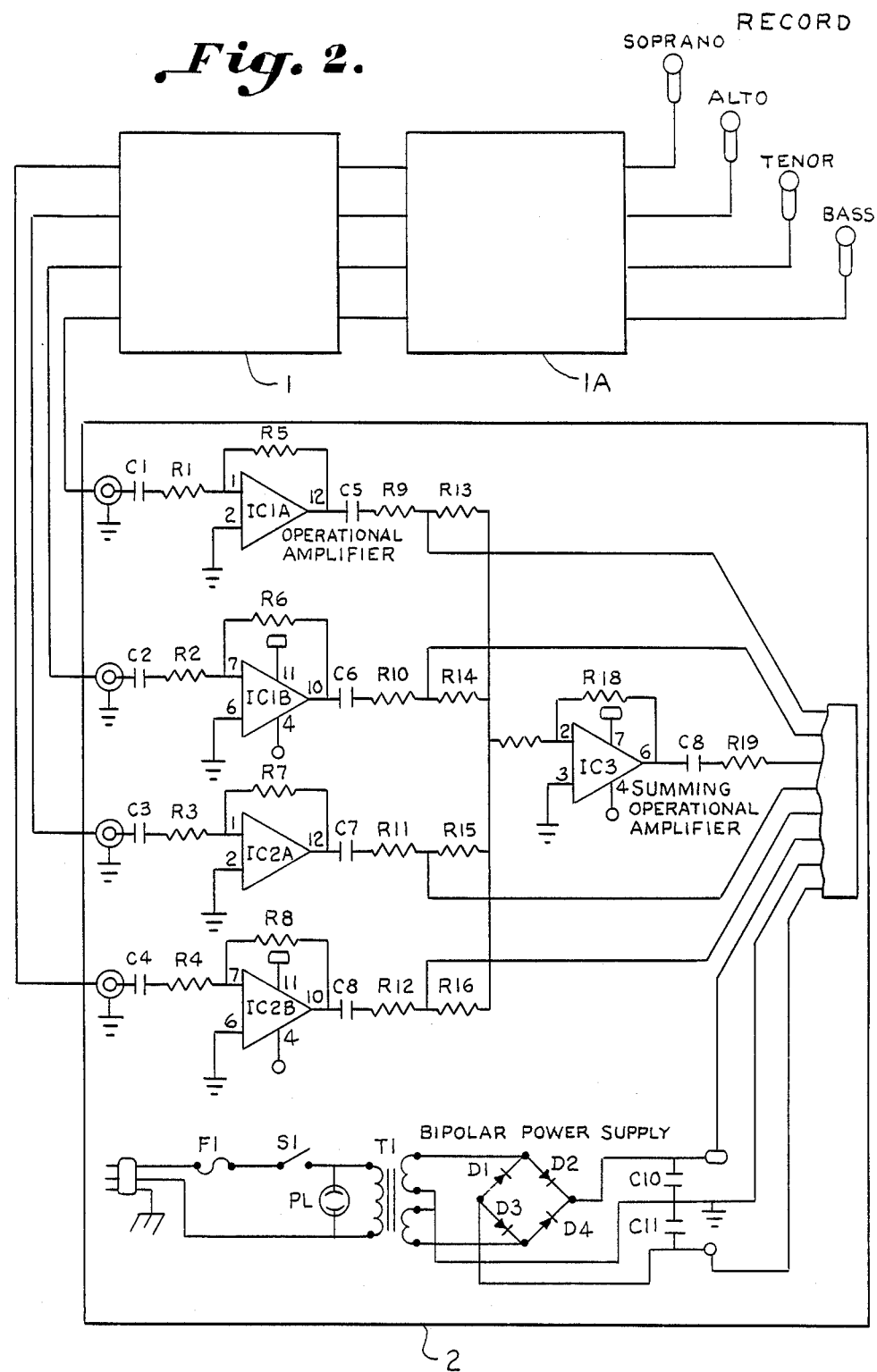
FIG. 2 is a schematic diagram illustrating the circuitry of the main amplifier.

FIG. 2 illustrates the main amplifier wherein said amplifier consists of one operational amplifier stage for each channel IC1A, IC1B, IC2A, IC2B; a summing operational amplifier IC3; and a bipolar power supply. As the fourchannel output of said cassette player feeds the input of said main amplifier at −10 db, said operational channel amplifier affords a ten decibel increase in signal level, while providing both a buffer to the cassette player's high impedance output and a low impedance source to drive the earphone amplifiers. Said summing operational amplifier mixes the output of all four channels to provide the integrated signal. Said bipolar power supply is capable of providing sufficient wattage to drive up to forty earphones on one line.

Figure 3:
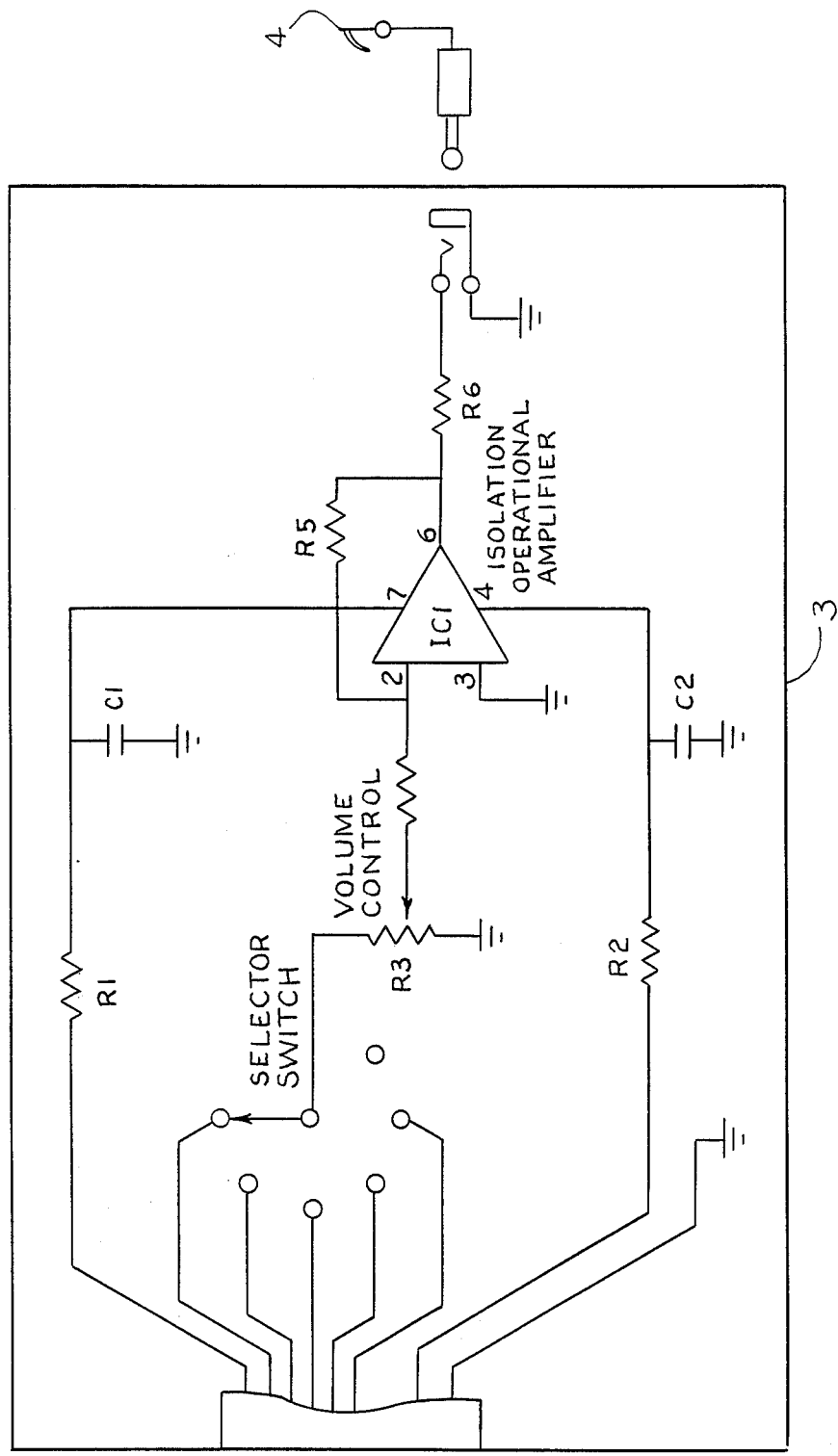
FIG. 3 is a schematic diagram illustrating the circuitry of the earphone amplifiers.

FIG. 3 illustrates a typical earphone amplifier control box wherein said control box contains a selector switch for choosing any of the four channels (the harmonic parts) or a mix-down of all four channels (the integrated signal). Also contained therein is a volume control R3 permitting the listener autonomy over the level of the chosen signal; an isolation operational amplifier IC1 which provides additional gain to drive the 300-ohm earphone while isolating it from the main amplifier; and an earphone jack to accommodate said 300-ohm earphone. The power fed to said earphone amplifier is decoupled from the main supply through two resistor/capacitor combinations R1, C1 and R2, C2.

The five audio signals and the ground, positive, and negative power supply voltages are fed to each of said earphone amplifiers via a color-coded, multi-conductor cabled with mating plugs and sockets at each of said boxes permitting connection or disconnection of the desired number of listening stations without disabling the entire system.

An additional feature of the system is that the 300-ohm impedance of the earphones maintains a constant signal level to each of said earphones regardless of the number of persons using said system.

Figure 4:
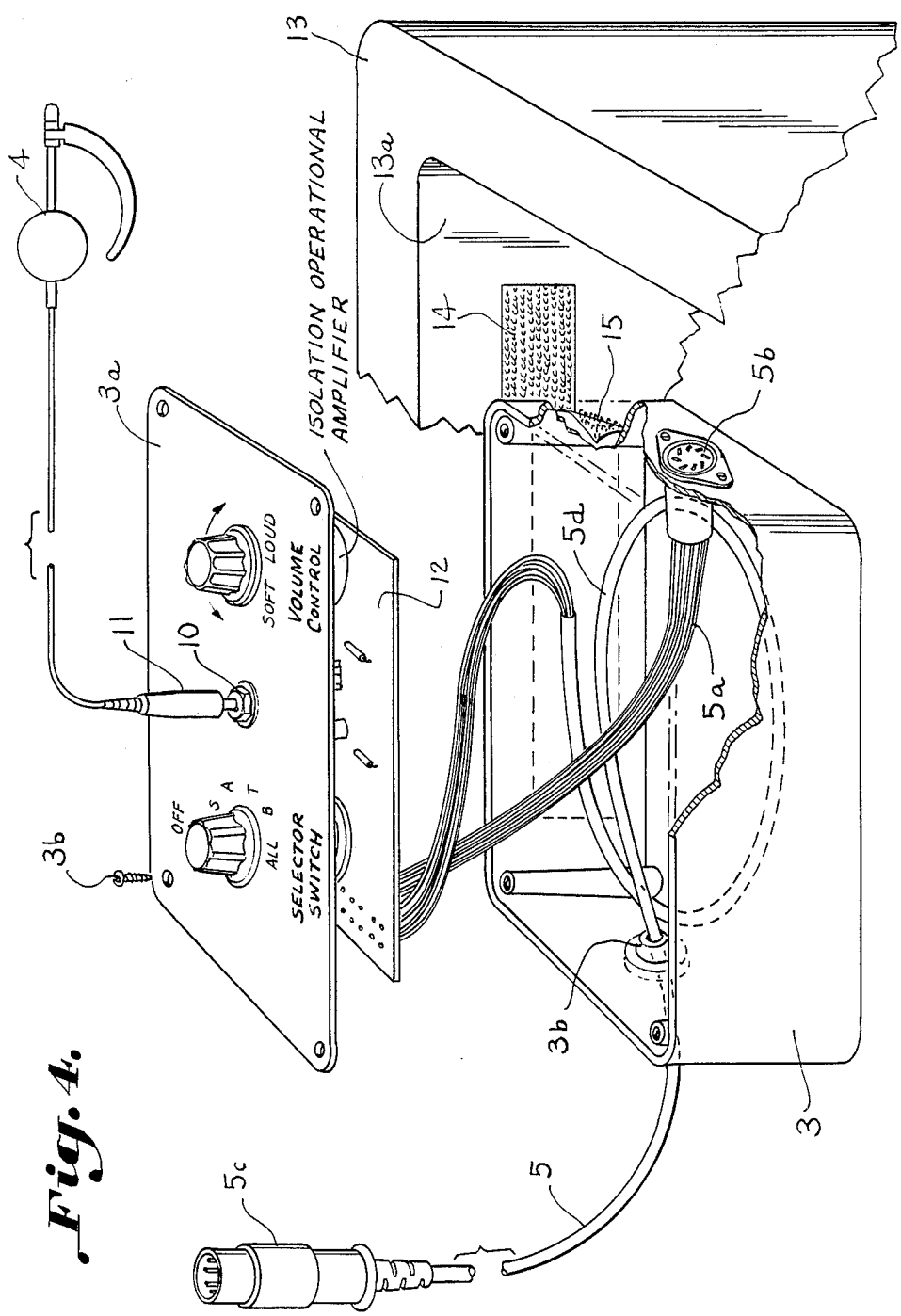
FIG. 4 is a perspective view illustrating a control box with connecting and mounting means.

FIG. 4 illustrates a rectangular control box 3 having a cover 3a. The cover is positionable through the use of screws 3b. The cover is illustrated as carrying the selector switch referred to above for use by individual participants in selecting the part desired, soprano, alto, tenor, bass or all. A socket 10 is also carried by the cover for carrying a jack 11 for the single earphones 4. The volume control and the isolation operational amplifier referred to above are also carried by the cover. The cover carries a circuit board 12 depending therefrom to which is connected the various wires contained within the cable 5. Wire leads 5a have connection with the respective wires at the circuit board 12 and are connected to the respective contacts of the receptacle 5b. The cable 5 has a plug 5c secured at its input end.

It will be observed that a number of convolutions 5d of the cable are contained within the box 3 and that an opening 3b is contained at one end of the box so that a predetermined amount of the cable may be withdrawn in such a way that frictional engagement between the cable and the box defined at the opening will position the cable so that only the amount of cable required may be utilized and the remainder retained within the box 3 beneath the circuit board 12.

A suitable support is illustrated at a choir stall 13 having an inner surface 13a receiving a strip of Velcro 14. A corresponding strip of Velcro 15 is positioned upon a front wall of the box 3 for positioning the control box in a desirable position for use by the respective participants.

While a preferred embodiment of the invention has been described using specific terms, such description is for illustrative purposes only, and it is to be understood that changes and variations may be made without departing from the spirit or scope of the following claims.

What is claimed is:

1. For use in choral instruction, an audio teaching system comprising:
   a recorder/player having at least four channels;
   a low noise, amplifier for said four channels;
   a mixer and equalizer for said four channels having the capability to record or play said four channels simultaneously with said channels being in the same direction and syncronized;
   a plurality of earphone amplifier control boxes connected in series; each of said control boxes having a selector switch for choosing any of the said four channels or a mix-down of all four channels;
   an isolation operational amplifier which provides additional gain to drive said earphones while isolating said earphones from the main amplifier;
   a volume control for said isolation operational amplifier permitting the listener autonomy over the level of the chosen signal;
   a single earphone; and
   an earphone connection to accommodate said earphone.

2. The audio teaching system set forth in claim 1 including a plug carried by each control box for connecting each control box in series with a preceding control box, and means in each of said control boxes containing an excess length of cable connected to said plugs while permitting a selected length of cable to be withdrawn from and to extend from said control box for connection to said preceding control box.

3. The audio teaching system set forth in claim 2 including Velcro fastening means carried by a support convenient to a user and by said control box for positioning said control boxes on said support.

* * * * *